(No Model.)
E. HUBER.
VEHICLE WHEEL.
No. 303,284. Patented Aug. 12, 1884.
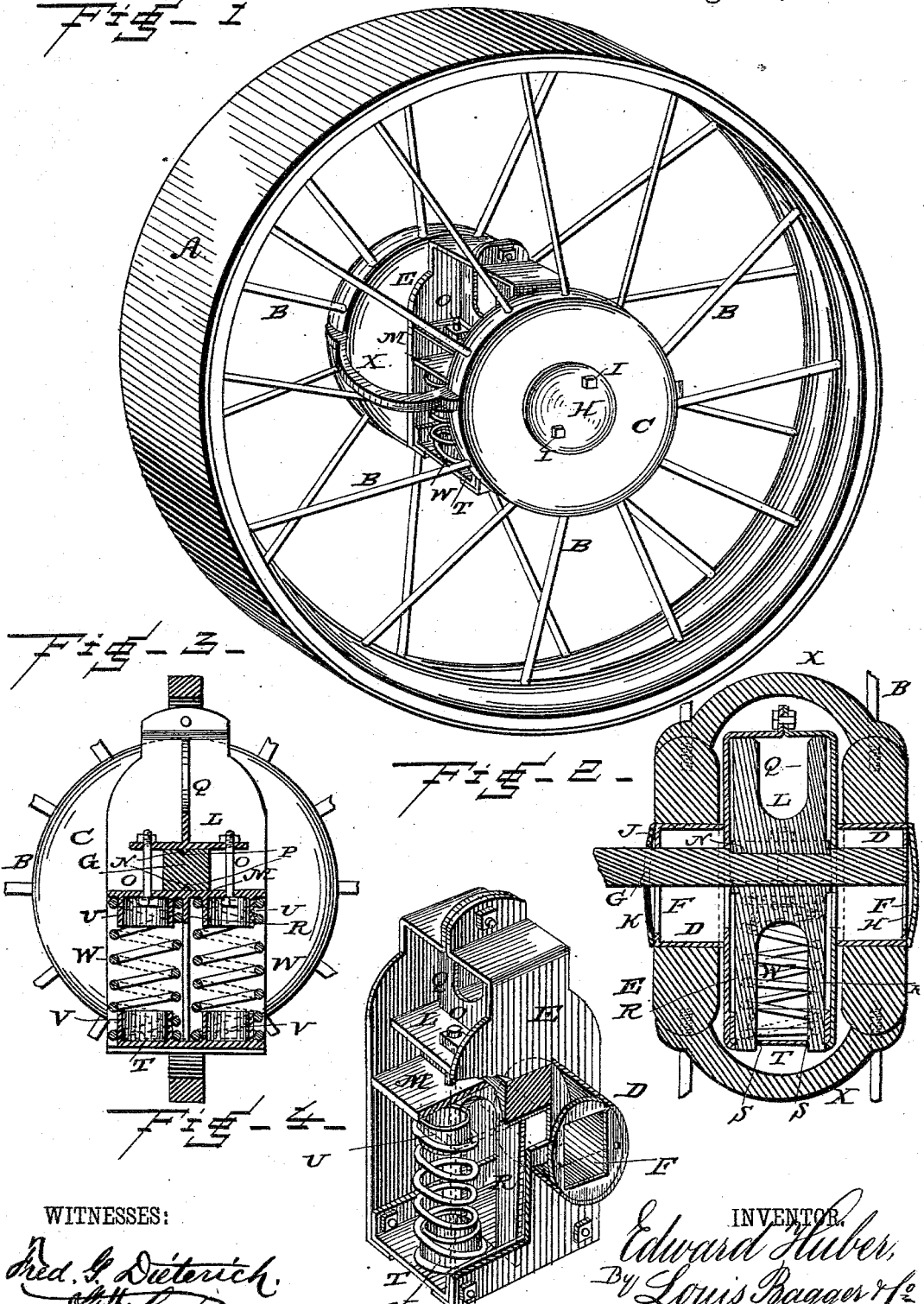
WITNESSES:
Fred. G. Dieterich
Wm. Lecher
INVENTOR.
Edward Huber,
By Louis Bagger & Co.
ATTORNEYS.

UNITED STATES PATENT OFFICE.

EDWARD HUBER, OF MARION, OHIO.

VEHICLE-WHEEL.

SPECIFICATION forming part of Letters Patent No. 303,284, dated August 12, 1884.

Application filed March 31, 1884. (No model.)

*To all whom it may concern:*

Be it known that I, EDWARD HUBER, a citizen of the United States, and a resident of Marion, in the county of Marion and State of Ohio, have invented certain new and useful Improvements in Vehicle-Wheels; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved vehicle-wheel. Fig. 2 is a section taken through the axle. Fig. 3 is a section at right angles to the axle, and Fig. 4 is a perspective detail view of the box containing the springs and its recessed spindles.

Similar letters of reference indicate corresponding parts in all the figures.

My invention has relation to wheels for traction-engines or other vehicles, especially such vehicles in which the construction of the axle or body offers difficulties for the application of springs between the body and the axle; and it consists in the improved construction and combination of parts of a wheel having springs confined in a bracket between its two hubs or disks upon which springs the axle rests, the hubs turning upon two spindles upon the bracket or frame through which the axle passes, and in which it slides, as hereinafter more fully described and claimed.

In the accompanying drawings, the letter A indicates the rim of the wheel, and B the spokes, which radiate from the two hubs C C to the rim. The hubs turn upon two spindles or trunnions, D D, projecting laterally from a frame, E, suspended between the hubs of the wheel from the said trunnions. These trunnions form vertical slots or recesses F, in which the end of the axle G, which is square, may slide up and down, and the end of the outer trunnion is covered by a plate, H, secured upon the same by means of screws I, the edges of the said plate projecting beyond the circumference of the trunnion bearing against the face of the outer hub confining the same, while the inner trunnion is provided with a similar plate, J, which, however, has a vertical slot, K, corresponding to the recess in the trunnion, allowing the axle to slide in the said slot. Two plates, L and M, having lips or lugs N upon the middle of their facing sides, are clamped upon the axle within the frame by means of nutted bolts O, the lugs fitting into recesses P in the upper and lower sides of the axle, and the outer sides of the plates are provided with upwardly and downwardly projecting guide-arms Q and R, the lower ones, R, of which slide in slots S in the lower cross-piece, T, of the frame, while the upper guide-arms, Q, bear against the inner sides of the frame. The under side of the lower plate is provided with two round downwardly-pointing projections, U, and the lower cross-piece of the frame is provided with similar upwardly-pointing projections, V, and two spiral springs, W, which, if desired, may be replaced by rubber springs, or springs of other constructions are secured at their upper and lower ends upon these projections.

For the purpose of holding the two hubs together at their relative distance brackets X are secured to the edges of the hubs, extending between them, the said brackets being sufficiently curved to admit of their turning freely under and above the frame when the wheel is turning.

It will be seen that while the wheel turns freely with its hubs upon the trunnions the axle will be cushioned by the springs, it having free vertical play in the recesses in the trunnions and being guided in its vertical play by the guide-arms upon the plate.

Having thus described my invention, I claim and desire to secure by Letters Patent of the United States—

In a vehicle-wheel, the combination of the wheel having two hubs, a frame having vertically-slotted trunnions, securing-plates fastened to the ends of the trunnions and projecting beyond their periphery, an axle sliding vertically in the slotted trunnions, plates having guide-arms and secured to the upper and lower side of the axle within the frame, the guide-arms of the lower plate sliding in slots in the lower end of the frame, and springs secured to the lower plate upon the axle and to the lower end of the frame cushioning the axle, as and for the purpose shown and set forth.

In testimony that I claim the foregoing as my own I have hereunto affixed my signature in presence of two witnesses.

EDWARD HUBER.

Witnesses:
 JOHN A. WALFORD,
 JAMES SWINNERTON.